United States Patent
Lambricht et al.

(10) Patent No.: US 10,577,275 B2
(45) Date of Patent: *Mar. 3, 2020

(54) GLASS SHEET HAVING HIGH TRANSMISSION OF INFRARED RADIATION

(71) Applicant: AGC GLASS EUROPE, Louvain-la-Neuve (BE)

(72) Inventors: Thomas Lambricht, Perwez (BE); Audrey Dogimont, Sart-Dames-Avelines (BE); Aline Degand, Bleret (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 0 days.

This patent is subject to a terminal disclaimer.

(21) Appl. No.: 15/737,117

(22) PCT Filed: Jun. 10, 2016

(86) PCT No.: PCT/EP2016/063256
§ 371 (c)(1),
(2) Date: Dec. 15, 2017

(87) PCT Pub. No.: WO2016/202689
PCT Pub. Date: Dec. 22, 2016

(65) Prior Publication Data
US 2018/0194667 A1 Jul. 12, 2018

(30) Foreign Application Priority Data

Jun. 18, 2015 (EP) ..................... 15172779

(51) Int. Cl.
C03C 3/087 (2006.01)
C03C 4/10 (2006.01)
C03C 4/02 (2006.01)
C03C 4/00 (2006.01)
C03C 3/091 (2006.01)

(52) U.S. Cl.
CPC ............. *C03C 3/087* (2013.01); *C03C 3/091* (2013.01); *C03C 4/0092* (2013.01); *C03C 4/02* (2013.01); *C03C 4/10* (2013.01); *C03C 2204/00* (2013.01)

(58) Field of Classification Search
CPC ................ C03C 3/087; C03C 3/091
See application file for complete search history.

(56) References Cited

U.S. PATENT DOCUMENTS

| 4,101,705 | A | 7/1978 | Fischer et al. |
| 5,023,210 | A | 6/1991 | Krumwiede et al. |
| 5,545,596 | A | 8/1996 | Alvarez Casariego et al. |
| 5,582,455 | A | 12/1996 | Casariego et al. |
| 5,985,780 | A | 11/1999 | Alvarez Casariego et al. |
| 6,531,422 | B1 | 3/2003 | Casariego et al. |
| 7,534,735 | B2 * | 5/2009 | Coster ............ C03C 3/087 501/70 |
| 9,950,946 | B2 * | 4/2018 | Dogimont ........... C03C 3/087 |
| 2007/0243993 | A1 | 10/2007 | Heithoff et al. |
| 2008/0131628 | A1 | 6/2008 | Abensour et al. |
| 2012/0315410 | A1 | 12/2012 | Heithoff et al. |
| 2014/0017500 | A1 | 1/2014 | Koike et al. |
| 2014/0092052 | A1 * | 4/2014 | Grunthaner ........... G06F 3/044 345/174 |
| 2016/0018949 | A1 | 1/2016 | Lambricht et al. |
| 2018/0170013 | A1 * | 6/2018 | Hubert ............ B32B 17/10036 |
| 2018/0170014 | A1 * | 6/2018 | Lambricht ........ B32B 17/10036 |
| 2018/0170793 | A1 * | 6/2018 | Lambricht ............. C03C 4/10 |
| 2018/0170794 | A1 * | 6/2018 | Lambricht ............ C03C 3/087 |

FOREIGN PATENT DOCUMENTS

| JP | 2001-19470 A | | 1/2001 | |
| JP | 2001019470 A | * | 1/2001 | ............ C03C 3/087 |
| WO | WO 2014/146939 A1 | | 9/2014 | |
| WO | WO-2015091106 A1 | * | 6/2015 | ............ C03C 3/087 |

OTHER PUBLICATIONS

International Search Report dated Sep. 5, 2016 in PCT/EP2016/063256 filed Jun. 10, 2016.

* cited by examiner

*Primary Examiner* — Elizabeth A. Bolden
(74) *Attorney, Agent, or Firm* — Oblon, McClelland, Maier & Neustadt, L.L.P.

(57) ABSTRACT

The invention relates to a glass sheet having high transmission of infrared (IR) radiation. More specifically, the invention relates to a glass sheet having a composition which comprises, in a content expressed as percentages by total weight of glass: $SiO_2$ 55-85% $Al_2O_3$ 0-30% $B_2O_3$ 0-20% $Na_2O$ 0-25% CaO 0-20% MgO 0-15% $K_2O$ 0-20% BaO 0-20% total iron (expressed in the form of $Fe_2O_3$) 0.002-1%, $Cr_2O_3$ 0.001-0.5% Co 0.0001-0.5% Se 0.0003-0.5%. By virtue of its high transmission of IR radiation, said glass sheet can advantageously be used in a device using a technology requiring very good transmission of IR radiation, whether through the main faces or starting from their edge (for example, a screen or panel or pad) The invention thus also relates to the use of such a glass sheet in a device using infrared radiation propagating essentially inside said sheet.

20 Claims, 5 Drawing Sheets

GLASS SHEET HAVING HIGH TRANSMISSION OF INFRARED RADIATION

1. FIELD OF THE INVENTION

The present invention relates to a glass sheet exhibiting high transmission of infrared radiation.

The glass sheet according to the invention can thus be advantageously used in any device requiring panels more or less large in size and using a technology requiring very good transmission of infrared radiation through said panels, whether through the main faces or starting from their edge.

For example, the glass sheet according to the invention can advantageously be used in a touch screen or touch panel or touchpad using the optical technology referred to as Planar Scatter Detection (PSD) or else Frustrated Total Internal Reflection (FTIR) technology (or any other technology using IR radiation in the edge of the glass) in order to detect the position of one or more objects (for example, a finger or a stylus) on a surface of said sheet. The invention consequently also relates to the use of such a glass sheet in a device using infrared radiation propagating essentially inside said sheet.

Finally, the invention also relates to a touch screen, a touch panel or a touchpad comprising such a glass sheet.

2. SOLUTIONS OF THE PRIOR ART

The PSD and FTIR technologies make it possible to obtain multiple-detection touch screens/touch panels which are inexpensive and which may have a relatively large touch surface (for example, from 3 to 100 inches) while being thin.

These two technologies involve:
(i) the injection of infrared (IR) radiation, for example by virtue of LEDs, into a substrate transparent to infrared radiation starting from one or more edges;
(ii) the propagation of the infrared radiation inside said substrate (which then acts as waveguide) via an optical phenomenon of total internal reflection (no radiation "exits" the substrate);
(iii) the contact of the surface of the substrate with any object (for example a finger or a stylus), resulting in a local perturbation by scattering of the radiation in all directions; some of the deflected rays will thus be able "to exit" the substrate.

In the FTIR technology, the deflected rays form an infrared light spot on the lower surface of the substrate, opposite the touch surface. These are seen by a special camera located below the device.

The PSD technology for its part involves two additional stages subsequent to stages (i)-(iii):
(iv) the analysis by a detector of the resulting IR radiation at the edge of the substrate; and
(v) the calculation by algorithms, starting from the radiation detected, of the position(s) of the object(s) in contact with the surface. This technology is set out in particular in the document US2013021300A1.

Basically, glass is a material of choice for touch panels as a result of its mechanical properties, its durability, its resistance to scratching and its optical clarity and because it can be chemically or thermally strengthened.

In the case of glass panels used for the PSD or FTIR technology and with a very large surface and thus with a relatively great length/width, the IR radiation injected has a long optical path length. In this case, the absorption of the IR radiation by the material of the glass thus significantly influences the sensitivity of the touch panel, which may then undesirably decrease in the length/width of the panel. In the case of glass panels used for the PSD or FTIR technology and with a smaller surface and thus with a shorter optical path length of the IR radiation injected, the absorption of the IR radiation by the material of the glass also has an influence, in particular on the energy consumption of the device incorporating the glass panel.

Thus, a glass sheet highly transparent to infrared radiation is very useful in this context, in order to guarantee an intact or sufficient sensitivity over the entire touch surface when this surface is large. In particular, a glass sheet with a coefficient of absorption in the range of wavelengths from 780 to 1200 nm (and more particularly from 850 to 1050 nm), generally used in these technologies, equal to or even less than 1 $m^{-1}$ is ideal.

Furthermore, a glass sheet highly transparent to infrared radiation, transparent in the visible region or slightly to strongly coloured, indeed even opaque, also proves to be very useful in other devices requiring panels more or less large in size and using a technology requiring very good transmission of infrared radiation through said panels, whether through the main faces (the optical path length then corresponds to the thickness of the sheet) or starting from their edge.

In order to obtain high transmission in the infrared region (and in the visible region), it is known to reduce the total content of iron in the glass (expressed in terms of $Fe_2O_3$, according to the standard practice in the field), obtaining low-iron glasses. Glasses of silicate type always comprise iron as the latter is present as an impurity in the majority of the starting materials used (sand, limestone, dolomite, and the like). Iron exists in the structure of the glass in the form of ferric $Fe^{3+}$ ions and ferrous $Fe^{2+}$ ions. The presence of ferric $Fe^{3+}$ ions confers, on the glass, a slight absorption of low-wavelength visible light and a stronger absorption in the near ultraviolet region (absorption band centered on 380 nm), while the presence of ferrous $Fe^{2+}$ ions (sometimes expressed as oxide FeO) results in a strong absorption in the near infrared region (broad absorption band centered on 1050 nm). Thus, the increase in the total iron content (in both its forms) accentuates the absorption in the visible region and in the infrared region. Furthermore, a high concentration of ferrous $Fe^{2+}$ ions results in a decrease in the transmission in the infrared region (in particular, the near infrared region). However, to achieve a coefficient of absorption in the range of wavelengths from 780 to 1200 nm which is sufficiently low for the touch applications by influencing only the total iron content would require such a great decrease in this total iron content that either (i) this would result in production costs which are much too high, due to the need for very pure starting materials (which sometimes even do not exist sufficiently pure), or (ii) this would present production problems (in particular the premature wear of the furnace and/or difficulties of heating the glass in the furnace).

It is also known, in order to further increase the transmission of the glass, to oxidize the iron present in the glass, that is to say to reduce the content of ferrous ions in favour of the content of ferric ions. The degree of oxidation of a glass is given by its redox, defined as the ratio by weight of $Fe^{2+}$ atoms to the total weight of iron atoms present in the glass, $Fe^{2+}$/total Fe.

In order to reduce the redox of the glass, it is known to add an oxidizing component to the batch of starting materials. However, the majority of the known oxidants (sulphates, nitrates, and the like) have an oxidizing power which is not sufficiently strong to achieve the IR transmission values desired in particular for the touch panels application using the FTIR or PSD technology, or have to be added in an excessively large amount with collateral disadvantages, such as cost, incompatibility with the production process, and the like.

Moreover, in order to obtain a glass sheet that is more or less intensely coloured, or even opaque, the practically universal solution is to use a glass composition based on iron in relatively large amounts, iron being a very effective and inexpensive colourant.

3. OBJECTIVES OF THE INVENTION

The objective of the invention, in at least one of its embodiments, is to provide a glass sheet with a high transmission of infrared radiation. In particular, it is an objective of the invention to provide a glass sheet with a high transmission of near infrared radiation, in particular in the range of wavelengths from 780 to 1200 nm and more particularly from 850 to 1050 nm.

Another objective of the invention, in at least one of its embodiments, is to provide a glass sheet with an attractiveness/colour/opacity suitable for the application chosen and/or market demand, while having a very good transmission of infrared radiation.

Another objective of the invention, in at least one of its embodiments, is to provide a glass sheet which is especially particularly enhanceable in value in a device using infrared radiation propagating essentially inside said sheet.

Another objective of the invention, in at least one of its embodiments, is to provide a glass sheet which, when it is used as touch surface in large-sized touch screens, touch panels or touchpads, results in no or little loss in sensitivity of the touch function.

Another objective of the invention, in at least one of its embodiments, is to provide a glass sheet which, when it is used as touch surface in touch screens, touch panels or touchpads of more modest sizes, is favourable to the energy consumption of the device.

Finally, another objective of the invention is to provide a glass sheet with a high transmission of infrared radiation which is inexpensive to produce.

4. SUMMARY OF THE INVENTION

The invention relates to a glass sheet having a composition which comprises, in a content expressed as percentages by total weight of glass:
$SiO_2$ 55-85%
$Al_2O_3$ 0-30%
$B_2O_3$ 0-20%
$Na_2O$ 0-25%
$CaO$ 0-20%
$MgO$ 0-15%
$K_2O$ 0-20%
$BaO$ 0-20%
total iron (expressed in $Fe_2O_3$ the form of) 0.002-1%;
the composition additionally comprising, as percentages by weight relative to the total weight of the glass:
a chromium (expressed in the form of $Cr_2O_3$) content ranging from 0.001% to 0.5%;
a cobalt (expressed in the form of Co) content ranging from 0.0001% to 0.5%;
a selenium (expressed in the form of Se) content ranging from 0.0003% to 0.5%;
said sheet having: TIR4>TLD4.

Thus, the invention is based on an entirely novel and inventive approach as it makes it possible to solve the technical problem posed. This is because the inventors have demonstrated that it is possible, by combining, in an iron-based glass composition, chromium, cobalt and selenium, within specific ranges of contents, to easily regulate the attractiveness, the colour, the transparency in the visible region/the opacity of the glass sheet as a function of the application targeted and/or market demand, but while surprisingly and significantly improving its transparency in the IR region, in particular in the range of wavelengths from 780 to 1200 nm. The inventors have thus discovered that it is possible in particular, by combining, in a glass composition, a low to moderate iron content, chromium, cobalt and selenium within certain ranges of contents, to obtain a glass which is highly transmitting of IR radiation, highly transparent in the visible region and with a "neutral" colour aesthetically in very great demand in many applications. In other ranges of contents of chromium, cobalt and selenium, the inventors have also discovered that it is also possible to obtain a lightly to very strongly coloured (in particular grey or bronze) glass, which thus transmits less or very little in the visible region (in great demand for other applications), while obtaining a high transmission of IR radiation. This last approach is surprising in the field of coloured glasses, for which a high selectivity ($T_L/T_E$) is generally desired.

Throughout the present text, when a range is indicated, the end values are included. In addition, all the integer values and sub-ranges in a numerical range are expressly included as if explicitly written. Also throughout the present text, the content values are in percentages, unless explicitly specified otherwise (for example, in ppm). Similarly, also throughout the present text, all the content values in percentages are by weight, i.e. expressed relative to the total weight of the glass.

Also throughout the present text:
the light transmission (expressed in %) is considered (according to the ISO 9050 standard) with the illuminant D65 for a glass sheet thickness of 4 mm (TLD4) at a solid observation angle of 2°, for a wavelength range between 380 and 780 nm;
the IR transmission (expressed in %) is considered (according to the ISO 9050 standard) for a thickness of 4 mm (TIR4) and for a wavelength range between 780 and 2500 nm; and
the CIELab parameters L*a*b* (that characterize the colour of the glass sheet) are considered in transmission, for a thickness of 5 mm and with the illuminant D65 (10°).

Other features and advantages of the invention will become more clearly apparent on reading the following description, examples and figures.

The glass sheet according to the invention is made of glass which may belong to various categories. The glass can thus be a glass of soda-lime-silica, aluminosilicate or borosilicate type, and the like. Preferably, the composition of the glass sheet comprises, in a content expressed as percentages by total weight of glass, the following base elements:

| | |
|---|---|
| $SiO_2$ | 55-78% |
| $Al_2O_3$ | 0-18% |
| $B_2O_3$ | 0-18% |
| $Na_2O$ | 0-20% |

|     |        |
| --- | ------ |
| CaO | 0-15%  |
| MgO | 0-10%  |
| K$_2$O | 0-10% |
| BaO | 0-5%.  |

More preferably and for reasons of lower production costs, the glass sheet according to the invention is a sheet of soda-lime-silica glass. Advantageously, according to this embodiment, the composition of the glass sheet comprises, in a content expressed as percentages by total weight of glass, the following base elements:

|     |        |
| --- | ------ |
| SiO$_2$ | 60-75% |
| Al$_2$O$_3$ | 0-6% |
| B$_2$O$_3$ | 0-4% |
| CaO | 0-15% |
| MgO | 0-10% |
| Na$_2$O | 5-20% |
| K$_2$O | 0-10% |
| BaO | 0-5%. |

The term "glass", within the meaning of the invention, is understood to mean a completely amorphous material, thus excluding any crystalline material, even partially crystalline material (such as, for example, glass-crystalline or glass-ceramic materials).

The composition of the glass sheet can comprise, in addition to the impurities present in particular in the starting materials, a low proportion of additives (such as agents which help the melting or the refining of the glass) or of components originating from the dissolution of the refractories constituting the melting furnaces.

The glass sheet according to the invention may be a glass sheet obtained by a float process, a drawing process, or a rolling process or any other known process for manufacturing a glass sheet from a molten glass composition. According to a preferred embodiment according to the invention, the glass sheet is a float glass sheet. The term "float glass sheet" is understood to mean a glass sheet formed by the float process, which consists in pouring the molten glass onto a bath of molten tin, under reducing conditions. A float glass sheet comprises, in a known way, a "tin face", that is to say a face enriched in tin in the body of the glass close to the surface of the sheet. The term "enrichment in tin" is understood to mean an increase in the concentration of tin with respect to the composition of the glass at the core, which may or may not be substantially zero (devoid of tin).

The glass sheet according to the invention can have varied and relatively large sizes. It can, for example, have sizes ranging up to 3.21 m×6 m or 3.21 m×5.50 m or 3.21 m×5.10 m or 3.21 m×4.50 m ("jumbo size" glass sheet) or else, for example, 3.21 m×2.55 m or 3.21 m×2.25 m ("lehr end size" glass sheet).

The glass sheet according to the invention can have a thickness varying between 0.1 and 25 mm. Advantageously, in the case of the touch panels application, the glass sheet according to the invention can have a thickness varying between 0.1 and 6 mm. Preferably, in the case of the touch screens application, for reasons of weight, the thickness of the glass sheet according to the invention is from 0.1 to 2.2 mm. Alternatively, preferably, for any application other than the screen application, essentially for reasons of mechanical strength, the thickness of the glass sheet according to the invention is from 2.8 to 12 mm.

According to the invention, the composition comprises a total iron (expressed in terms of Fe$_2$O$_3$) content ranging from 0.002% to 1% by weight, with respect to the total weight of the glass. A total iron (expressed in the form of Fe$_2$O$_3$) content of less than or equal to 1% makes it possible to retain a high transmission in the infrared region. The minimal value makes it possible not to adversely affect the cost of the glass due to the price of the iron-poor starting materials. It should be noted that, in the present document, "total iron" is used as well as "Fe$_2$O$_3$" to denote the total iron content of the glass composition (expressed in the form of Fe$_2$O$_3$).

Alternatively and advantageously, the composition preferably comprises a total iron (expressed in the form of Fe$_2$O$_3$) content such that: $0.002\% \leq Fe_2O_3 \leq 0.7\%$, or better $0.002\% \leq Fe_2O_3 \leq 0.3\%$. Very preferably, the composition comprises a total iron content such that: $0.002\% \leq Fe_2O_3 \leq 0.15\%$, or better $0.002\% \leq Fe_2O_3 \leq 0.1\%$. More preferably, the composition of the invention comprises a total iron content such that $0.002\% \leq Fe_2O_3 \leq 0.06\%$, or even $0.002\% \leq Fe_2O_3 \leq 0.04\%$, or even better $0.002\% \leq Fe_2O_3 \leq 0.02\%$. More preferably still, the composition comprises a total iron content such that $0.002\% \leq Fe_2O_3 \leq 0.015\%$, or even $0.002\% \leq Fe_2O_3 \leq 0.01\%$. Such decreasing maximum values of iron make it possible to further increase the IR transmission and also the light transmission of the glass sheet.

Alternatively and advantageously also, the composition preferably comprises a total iron content such that: $0.01\% \leq Fe_2O_3 \leq 1\%$, or better $0.01\% \leq Fe_2O_3 \leq 0.7\%$, or even better $0.01\% \leq Fe_2O_3 \leq 0.3\%$. Very preferably, the composition comprises a total iron content such that: $0.01\% \leq Fe_2O_3 \leq 0.15\%$, or better $0.01\% \leq Fe_2O_3 \leq 0.1\%$. More preferably still, the composition of the invention comprises a total iron content such that $0.01\% \leq Fe_2O_3 \leq 0.06\%$, or even 0.01% total iron 0.04%, or even better $0.01\% \leq Fe_2O_3 \leq 0.02\%$.

Alternatively and advantageously also, the composition preferably comprises a total iron content such that: $0.02\% \leq Fe_2O_3 \leq 1\%$, or better $0.02\% \leq Fe_2O_3 \leq 0.7\%$, or even better $0.02\% \leq Fe_2O_3 \leq 0.3\%$. Very preferably, the composition comprises a total iron content such that: 0.02% Fe$_2$O$_3$ 0.15%, or better $0.02\% \leq Fe_2O_3 \leq 0.1\%$. More preferably still, the composition of the invention comprises a total iron content such that $0.02\% \leq Fe_2O_3 \leq 0.06\%$, or even $0.02\% \leq Fe_2O_3 \leq 0.04\%$.

Alternatively and advantageously also, the composition preferably comprises a total iron content such that: $0.04\% \leq Fe_2O_3 \leq 1\%$, or better $0.04\% \leq Fe_2O_3 \leq 0.7\%$, or even better $0.04\% \leq Fe_2O_3 \leq 0.3\%$. Very preferably, the composition comprises a total iron content such that: $0.04\% \leq Fe_2O_3 \leq 0.15\%$, or better $0.04\% \leq Fe_2O_3 \leq 0.1\%$. More preferably still, the composition of the invention comprises a total iron content such that $0.04\% \leq Fe_2O_3 \leq 0.06\%$.

Alternatively and advantageously also, the composition preferably comprises a total iron content such that: $0.06\% \leq Fe_2O_3 \leq 1\%$, or better $0.06\% \leq Fe_2O_3 \leq 0.7\%$, or even better $0.06\% \leq Fe_2O_3 \leq 0.3\%$. Very preferably, the composition comprises a total iron content such that: $0.06\% \leq Fe_2O_3 \leq 0.15\%$, or better $0.06\% \leq Fe_2O_3 \leq 0.1\%$.

According to one advantageous embodiment of the invention, the composition of the glass sheet comprises: $Fe_2O_3 \leq 7*Cr_2O_3$ (Fe$_2$O$_3$ being the total iron content and Cr$_2$O$_3$ the chromium content, which are expressed as percentages by weight). Preferably, the composition of the glass sheet comprises: $Fe_2O_3 \leq 5*Cr_2O_3$, or even better, the composition of the glass sheet comprises: $Fe_2O_3 \leq 4*Cr_2O_3$.

More preferably, the composition of the glass sheet comprises: $Fe_2O_3 \leq 3*Cr_2O_3$. Very preferably, the composition of the glass sheet comprises: $Fe_2O_3 \leq 2*Cr_2O_3$. Such iron-chromium relationships enable an almost complete oxidation of the ferrous iron to ferric iron over a wide range of industrial conditions, and therefore a maximized infrared transmission.

According to the invention, the composition comprises a cobalt (expressed in terms of Co) content ranging from 0.0001%-0.5% by weight, with respect to the total weight of the glass. Preferably, the composition comprises a cobalt content ranging from 0.0001%-0.2%, or even from 0.0001%-0.1%. More preferably, the composition comprises a cobalt (expressed in terms of Co) content ranging from 0.0001%-0.05%. More preferably still, the composition comprises a cobalt (expressed in terms of Co) content ranging from 0.0001%-0.025%. Most preferably, the composition comprises a cobalt content ranging from 0.0001%-0.02% or from 0.0001%-0.015%, or even better from 0.0001%-0.01%. Such cobalt ranges make it possible to achieve the desired colour without excessively degrading the light transmission.

Advantageously, the composition comprises a cobalt (expressed in terms of Co) content ranging from 0.001%-0.5%, or even from 0.001%-0.2%. Preferably, the composition comprises a cobalt content ranging from 0.001%-0.1%. More preferably, the composition comprises a cobalt content ranging from 0.001%-0.05%. More preferably, the composition comprises a cobalt content ranging from 0.001%-0.025% or from 0.001%-0.02%, or even better from 0.002%-0.02%. Such cobalt ranges make it possible to achieve the desired colour without excessively degrading the light transmission.

According to the invention, the composition comprises a chromium (expressed in terms of $Cr_2O_3$) content ranging from 0.001%-0.5% by weight, with respect to the total weight of the glass. Preferably, the composition comprises a chromium (expressed in terms of $Cr_2O_3$) content ranging from 0.001%-0.25%, or even from 0.001%-0.15%. More preferably still, the composition comprises a chromium content ranging from 0.001%-0.1% or even from 0.001%-0.075%, or even better from 0.001%-0.05%. Such chromium ranges make it possible to achieve the desired colour and also to guarantee an almost complete oxidation of the ferrous iron to ferric iron over a wide range of industrial conditions, and therefore a maximized infrared transmission.

Alternatively and advantageously, the composition preferably comprises a chromium (expressed in terms of $Cr_2O_3$) content ranging from 0.0015%-0.5% by weight, with respect to the total weight of the glass. Preferably, the composition comprises a chromium (expressed in terms of $Cr_2O_3$) content ranging from 0.0015%-0.25%, or even from 0.0015%-0.15%. More preferably still, the composition comprises a chromium (expressed in terms of $Cr_2O_3$) content ranging from 0.0015%-0.1% or even from 0.0015%-0.075%, or even better from 0.0015%-0.05%. Most preferably, the composition comprises a chromium content ranging from 0.002%-0.05% or even from 0.0025%-0.05%. Such chromium ranges make it possible to achieve the desired colour and also to guarantee an almost complete oxidation of the ferrous iron to ferric iron over a wide range of industrial conditions, and therefore a maximized infrared transmission, while increasingly controlling the loss in light transmission.

According to the invention, the composition comprises a selenium (expressed in terms of Se) content ranging from 0.0003%-0.5% by weight, with respect to the total weight of the glass. Preferably, the composition comprises a selenium content ranging from 0.0003%-0.25% or even from 0.0003%-0.15%, or even better from 0.0003%-0.1%. More preferably, the composition comprises a selenium (expressed in terms of Se) content ranging from 0.0003%-0.075%, or even from 0.0003%-0.05%. Alternatively, preferably, the composition comprises a selenium (expressed in terms of Se) content ranging from 0.001%-0.5%, or better from 0.001%-0.25% or even better from 0.001%-0.15% or even better from 0.001%-0.1%. More preferably, the composition comprises a selenium content ranging from 0.001%-0.075%, or even from 0.001%-0.05%. Alternatively, preferably also, the composition comprises a selenium (expressed in terms of Se) content ranging from 0.0015%-0.075% or even from 0.003%-0.075% or even better from 0.005%-0.075%. Alternatively, preferably also, the composition comprises a selenium (expressed in terms of Se) content ranging from 0.0015%-0.05% or even from 0.003%-0.05% or even better from 0.005%-0.05%. Such selenium ranges make it possible to achieve the desired colour without excessively degrading the light transmission.

According to one embodiment of the invention, the composition may comprise nickel in a content (expressed in the form of Ni) ranging from 0.0005% to 0.5% and, preferably, ranging from 0.002% to 0.1%. This has the advantage of making it possible to reduce the amount of selenium needed, but still within the range according to the invention, and therefore to avoid the retention problems that are linked thereto (nickel being for its part not very volatile).

Preferably, according to the invention, the composition comprises an $Fe^{2+}$ content (expressed in the form of FeO) of less than 20 ppm. This range of contents makes it possible to obtain highly satisfactory properties, in particular in terms of transmission of the IR radiation. Preferably, the composition comprises an $Fe^{2+}$ content (expressed in the form of FeO) of less than 10 ppm. Very preferably, the composition comprises an $Fe^{2+}$ content (expressed in the form of FeO) of less than 5 ppm.

According to one advantageous embodiment of the invention, the composition of the glass sheet has a redox of less than 15%. Preferably, the redox is less than 10%, or else less than 5% or even less than 3%.

Advantageously, preferably, the glass sheet of the invention has TIR4>TLD4+2. More preferably, the glass sheet of the invention has TIR4>TLD4+5, or even better TIR4>TLD4+10. Alternatively, preferably, the glass sheet of the invention has TIR4>1.05*TLD4 and preferentially TIR4>1.05*TLD4+5. Alternatively also, preferably, the glass sheet of the invention has TIR4>1.1*TLD4. Alternatively also, preferably, the glass sheet of the invention has TIR4>0.95*TLD4+5. More preferably, the glass sheet of the invention has TIR4>0.95*TLD4+10. Alternatively also, preferably, the glass sheet of the invention has TIR4>0.9*TLD4+10. More preferably, the glass sheet of the invention has TIR4>0.9*TLD4+15. Alternatively also, preferably, the glass sheet of the invention has TIR4>0.85*TLD4+15. More preferably, the glass sheet of the invention has TIR4>0.85*TLD4+20. Alternatively also, preferably, the glass sheet of the invention has TIR4>0.8*TLD4+20. All the latter embodiments regarding the relationship between TIR4 and TLD4 have the advantage of making the glass sheet of the invention even more anti-selective.

According to a particularly advantageous first main embodiment of the invention, the composition comprises:

a total iron (expressed in the form of $Fe_2O_3$) content ≤0.7%;

a chromium (expressed in the form of $Cr_2O_3$) content ≤0.0465%;

a cobalt (expressed in the form of Co) content ≤0.004%;

$Se*Fe_2O_3 \leq 0.0012\%$; and $(3000*Co)+(260*Cr_2O_3)+(10000*Se*Fe_2O_3)+(16.2*Fe_2O_3)<12$.

Such an embodiment makes it possible to guarantee a high transmission in the IR region, a light transmission TLD4 of greater than 80% being obtained, without significantly impacting the colouration of the glass sheet (colour neutral to very slightly coloured).

According to this first main embodiment of the invention, the composition preferably comprises:

a total iron (expressed in the form of $Fe_2O_3$) content ≤0.6%;

a chromium (expressed in the form of $Cr_2O_3$) content ≤0.0385%;

a cobalt (expressed in the form of Co) content ≤0.0033%;

$Se*Fe_2O_3 \leq 0.001\%$; and $(3000*Co)+(260*Cr_2O_3)+(10000*Se*Fe_2O_3)+(16.2*Fe_2O_3)<10$;

which has the advantage of guaranteeing a high transmission in the IR region, a light transmission TLD4 of greater than 82% being obtained, without significantly impacting the colouration of the glass sheet (colour neutral to very slightly coloured).

Still according to this first main embodiment of the invention, more preferably still, the composition comprises:

a total iron (expressed in the form of $Fe_2O_3$) content ≤0.4%;

a chromium (expressed in the form of $Cr_2O_3$) content ≤0.027%;

a cobalt (expressed in the form of Co) content ≤0.0023%;

$Se*Fe_2O_3 \leq 0.0007\%$; and $(3000*Co)+(260*Cr_2O_3)+(10000*Se*Fe_2O_3)+(16.2*Fe_2O_3)<7$;

which has the advantage of guaranteeing a high transmission in the IR region, a light transmission TLD4 of greater than 85% being obtained, without significantly impacting the colouration of the glass sheet (colour neutral to very slightly coloured).

Still according to the first main embodiment of the invention, very preferably, the composition comprises:

a total iron (expressed in the form of $Fe_2O_3$) content ≤0.3%;

a chromium (expressed in the form of $Cr_2O_3$) content ≤0.019%;

a cobalt (expressed in the form of Co) content ≤0.0017%;

$Se*Fe_2O_3 \leq 0.0005\%$; and $(3000*Co)+(260*Cr_2O_3)+(10000*Se*Fe_2O_3)+(16.2*Fe_2O_3)<5$;

which has the advantage of guaranteeing a high transmission in the IR region, a light transmission TLD4 of greater than 87% being obtained, without significantly impacting the colouration of the glass sheet (colour neutral to very slightly coloured).

Still according to the first main embodiment of the invention, very preferably also, the composition comprises:

a total iron (expressed in the form of $Fe_2O_3$) content ≤0.2%;

a chromium (expressed in the form of $Cr_2O_3$) content ≤0.011%;

a cobalt (expressed in the form of Co) content ≤0.001%;

$Se*Fe_2O_3 \leq 0.0003\%$; and $(3000*Co)+(260*Cr_2O_3)+(10000*Se*Fe_2O_3)+(16.2*Fe_2O_3)<3$;

which has the advantage of guaranteeing a high transmission in the IR region, a light transmission TLD4 of greater than 89% being obtained, without significantly impacting the colouration of the glass sheet (colour neutral to very slightly coloured).

Still according to the first main embodiment of the invention, most preferably, the composition comprises:

a total iron (expressed in the form of $Fe_2O_3$) content ≤0.06%;

a chromium (expressed in the form of $Cr_2O_3$) content ≤0.004%;

a cobalt (expressed in the form of Co) content ≤0.0003%;

$Se*Fe_2O_3 \leq 0.0001\%$; and $(3000*Co)+(260*Cr_2O_3)+(10000*Se*Fe_2O_3)+(16.2*Fe_2O_3)<1$;

which has the advantage of guaranteeing a high transmission in the IR region, a light transmission TLD4 of greater than 90% being obtained, without significantly impacting the colouration of the glass sheet (colour neutral to very slightly coloured).

Still according to the first main embodiment of the invention, the glass sheet preferably has a light transmission TLD4 of greater than 80%. More preferably, the glass sheet has a light transmission TLD4 of greater than 82%, even better of greater than 85%, 87%, 89% or even better 90%.

The glass sheet according to the first main embodiment of the invention can advantageously be used in any device requiring panels more or less large in size and using a technology requiring (i) very good transmission of infrared radiation through said panels, whether through the main faces or starting from their edge, and (ii) very good transmission in the visible region, and also a "neutral" colouration. The neutrality of a glass sheet is evaluated by considering the distance from the origin (0,0) in the a*b* diagram.

For example, the glass sheet according to this first main embodiment can advantageously be used in any technology using IR radiation propagating in the edge of the glass. In particular, the sheet according to this first main embodiment is enhanceable in value in the "Planar Scatter Detection" (PSD) or else "Frustrated Total Internal Reflection" (FTIR) optical technology for detecting the position of one or more objects (for example, a finger or a stylus) on a surface of said sheet.

In view of its good transmission in the visible region and its highly neutral to slightly coloured colouration, the glass sheet according to this first main embodiment can advantageously be used as touch screen or touch panel or touchpad, in particular fitted above a display surface. Thus, the invention also relates to a touch screen or a touch panel or a touchpad, comprising at least one glass sheet according to the first main embodiment of the invention, defining a touch surface. In this case and preferably, the touch screen or the touch panel or the touchpad advantageously uses the FTIR or PSD optical technology. In particular, in this case, the glass sheet is advantageously fitted above a display surface.

According to a particularly advantageous second main embodiment of the invention, the composition comprises: $(3000*Co)+(260*Cr_2O_3)+(10000*Se*Fe_2O_3)+(16.2*Fe_2O_3) \geq 12$. Such compositions make it possible to obtain a coloured glass sheet, of grey or bronze tint, that is coloured more or less intensively to opaque, with little or no transmission in the visible region, while maintaining high transmission of infrared radiation.

According to this second main embodiment of the invention, the composition preferably comprises: $1*Co<Se<10*Co$. More preferably, the composition comprises: $1*Co<Se<8*Co$, or even better, $1*Co<Se<5*Co$. More preferably still, the composition comprises: $1*Co<Se<3*Co$, or even better, $2*Co<Se<3*Co$. Such relationships between the contents of selenium and cobalt make it possible to obtain a glass sheet of pleasant, substantially grey colour, that is coloured more or less intensively to opaque, with little or no transmission in the visible region, while maintaining high transmission of infrared radiation.

According to the second main embodiment of the invention, preferably and in possible combination with the preceding embodiments linking the cobalt and the selenium, the composition preferably comprises: $1*Co<Cr_2O_3<10*Co$. More preferably, the composition comprises: $1*Co<Cr_2O_3<8*Co$, or even better $1*Co<Cr_2O_3<5*Co$. More preferably still, the composition comprises: $1*Co<Cr_2O_3<4*Co$, or even better $2*Co<Cr_2O_3<4*Co$. Most preferably, the composition comprises: $3*Co<Cr_2O_3<4*Co$. Such relationships between the contents of chromium and cobalt make it possible to obtain a glass sheet of pleasant, substantially grey colour, that is coloured more or less intensively to opaque, with little or no transmission in the visible region, while maintaining high transmission of infrared radiation.

Any combination of an embodiment linking cobalt and selenium as described above with an embodiment linking chromium and cobalt as described above is particularly advantageous.

Alternatively, still according to the second main embodiment of the invention, the composition preferably comprises: $2*Co<Se<17*Co$. More preferably, the composition comprises: $5*Co<Se<17*Co$, or even better, $6*Co<Se<17*Co$. More preferably still, the composition comprises: $7*Co<Se<17*Co$, or even better, $7*Co<Se<15*Co$. Most preferably, the composition comprises: $7*Co<Se<11*Co$. Such relationships between the contents of selenium and cobalt make it possible to obtain a glass sheet of pleasant, substantially bronze colour, that is coloured more or less intensively to opaque, with little or no transmission in the visible region, while maintaining high transmission of infrared radiation.

Still according to the second main embodiment of the invention, preferably and in possible combination with the preceding embodiments linking the cobalt and the selenium, the composition preferably comprises: $2*Co<Cr_2O_3<10*Co$. More preferably, the composition comprises: $2*Co<Cr_2O_3<8*Co$, or even better $2*Co<Cr_2O_3<6*Co$. More preferably still, the composition comprises: $2*Co<Cr_2O_3<5*Co$, or even better $3*Co<Cr_2O_3<5*Co$. Such relationships between the contents of chromium and cobalt make it possible to obtain a glass sheet of pleasant, substantially bronze colour, that is coloured more or less intensively to opaque, with little or no transmission in the visible region, while maintaining high transmission of infrared radiation.

Any combination of an embodiment linking cobalt and selenium as described above with an embodiment linking chromium and cobalt as described above is particularly advantageous.

Still according to the second main embodiment of the invention, the glass sheet preferably has a light transmission TLD4 of less than 80%. More preferably, the glass sheet has a light transmission TLD4 of less than 75%, or better of less than 70% or even of less than 50%. For certain applications requiring a colour that is very dark or even up to virtual opacity, the glass sheet may have a light transmission TLD4 of less than 10%.

Advantageously, still according to the second main embodiment of the invention, preferably, the glass sheet of the invention has TIR4>TLD4+15, or even better TIR4>TLD4+20. Alternatively, still according to the second main embodiment of the invention, preferably, the glass sheet of the invention has TIR4>1.05*TLD4+10. Alternatively, still according to the second main embodiment of the invention, preferably, TIR4>1.1*TLD4+5. Alternatively, still according to the second main embodiment of the invention, preferably, the glass sheet of the invention has TIR4>1.15*TLD4 and even better TIR4>1.2*TLD4. Alternatively, still according to the second main embodiment of the invention, preferably, the glass sheet of the invention has TIR4>0.9*TLD4+20. All the latter embodiments regarding the relationship between TIR4 and TLD4 have the advantage of making the coloured glass sheet of the invention even more anti-selective.

Still according to the second main embodiment of the invention, the glass sheet of the invention is coloured. Preferably, the glass sheet has: $|b*|<5$ and $|a*|<5$. This is advantageous since it makes it possible to reproduce the colours of all the grey glasses available on the market, while guaranteeing a high infrared transmission. Preferably, the glass sheet has: $|b*|<3$ and $|a*|<3$, which makes it possible to reproduce the colours of all the grey glasses available on the market, while guaranteeing a better neutrality and a high infrared transmission.

Very preferably, the glass sheet has: $0<a*<1$; $-3<b*<0$; which makes it possible to reproduce a light grey glass available on the market (e.g. "Planibel Grey").

Alternatively, preferably, the glass sheet has: $-2.5<a*<1.5$ and $-2.5<b*<1.5$; which makes it possible to reproduce a dark grey glass available on the market (e.g. "Planibel Dark Grey").

Alternatively, also preferably, the glass sheet has: $2<a*<5$; $3<b*<7$; which makes it possible to reproduce a bronze glass available on the market (e.g. "Planibel Bronze").

A glass sheet according to the second main embodiment of the invention can advantageously be used in any device requiring panels more or less large in size and requiring (i) very good transmission of infrared radiation through said panels, either through the main faces or starting from their edge, and (ii) a specific colour or (virtual) opacity in the visible region.

For example, the glass sheet according to the second main embodiment can advantageously be used in any technology using IR radiation propagating in the edge of the glass. In particular, it can be enhanceable in value in the "Planar Scatter Detection" (PSD) or "Frustrated Total Internal Reflection" (FTIR) optical technology for detecting the position of one or more objects (for example, a finger or a stylus) on a surface of said sheet which, in view of its more or less intense to opaque colour, is capable of partially or completely hiding objects/components found behind/under it.

Still as examples, the glass sheet in particular according to the second main embodiment of the invention can also be enhanced in value:

(1) as decorative panel positioned in front of/around a radiant heating element, hiding (partially or completely) the unattractive side of the heating element but allowing the IR radiation to pass and thus making possible a good output from the heating device (as device, a wall heating device or else an IR cooktop may in particular be considered);

(2) as architectural or decorative spandrel glass;

(3) as pointing device on portable computers (commonly known as "touchpad"), sometimes using a technology requiring infrared radiation. In this case, the glass sheet is preferably very dark, indeed even opaque, in colour and thus hides the electronic components located under it;

(4) as front face element of furniture and in particular of furniture intended to include remote controllable electrical/electronic appliances, hiding from view the unattractive side of such appliances but allowing the signal emitted by the remote controls to pass. This is because the majority of domestic electrical/electronic appliances (televisions, hi-fis, DVD players, games consoles, and the like) are remote controllable using a housing which emits signals in the near infrared region. However, this remote control system exhibits in particular two disadvantages: (i) the signal is often disrupted by the presence of secondary radiation in the visible region (sun, lights), which render it less sensitive, and (ii) it requires that the appliances be reachable by the IR signal of the remote control and thus these cannot be concealed inside an item of furniture, even if demand is nevertheless proceeding in this direction for aesthetic reasons.

According to the invention, whether for the first or the second main embodiment described above, the glass sheet has a high transmission of IR radiation. More specifically, the glass sheet of the present invention has a high transmission of radiation in the near infrared region, in a range from 750 to 1200 nm. Preferably, the glass sheet has a transmission TIR4>70%, or >80% or even >85% or even better >87% or >90%.

In addition to the transmission TIR, within the context of applications that use for example devices requiring PSD or FTIR technology, in order to quantify the good transmission of the glass in the infrared range at specific wavelengths that are of interest for said applications, use is made of the coefficients of absorption at the wavelengths of 1050, 950 and 850 nm, which must hence be as low as possible in order to obtain a good transmission. The coefficient of absorption is defined by the ratio of the absorbance to the length of the optical path travelled by electromagnetic radiation in a given medium. It is expressed in $m^{-1}$. It is thus independent of the thickness of the material but it is a function of the wavelength of the radiation absorbed and of the chemical nature of the material.

In the case of glass, the coefficient of absorption ($\mu$) at a chosen wavelength $\lambda$ can be calculated from a measurement of transmission (T) and from the refractive index n of the material (thick=thickness), the values of n, $\rho$ and T being a function of the chosen wavelength $\lambda$:

$$\mu = -\frac{1}{thick} \cdot \ln\left[\frac{-(1-\rho)^2 + \sqrt{(1-\rho)^4 + 4.T^2.\rho^2}}{2.T.\rho^2}\right]$$

with $\rho = (n-1)^2/(n+1)^2$

According to the first main embodiment of the invention, the glass sheet has a coefficient of absorption at the wavelengths of 1050, 950 and 850 nm which is lower than that of a "clear" glass from the prior art or even of an "extra-clear" glass from the prior art.

Advantageously, the glass sheet according to the first main embodiment of the invention has a coefficient of absorption at the wavelength of 1050 nm of less than 5 $m^{-1}$. Preferably, it has a coefficient of absorption at the wavelength of 1050 nm of less than or equal to 2 $m^{-1}$. Very preferably, it has a coefficient of absorption at the wavelength of 1050 nm of less than or equal to 1 $m^{-1}$.

Advantageously again, the glass sheet according to the first main embodiment of the invention has a coefficient of absorption at the wavelength of 950 nm of less than 5 $m^{-1}$. Preferably, it has a coefficient of absorption at the wavelength of 950 nm of less than or equal to 2 $m^{-1}$. Very preferably, it has a coefficient of absorption at the wavelength of 950 nm of less than or equal to 1 $m^{-1}$.

Advantageously again, the glass sheet according to the first main embodiment of the invention has a coefficient of absorption at the wavelength of 850 nm of less than 5 $m^{-1}$. Preferably, it has a coefficient of absorption at the wavelength of 850 nm of less than or equal to 2 $m^{-1}$. Very preferably, it has a coefficient of absorption at the wavelength of 850 nm of less than or equal to 1 $m^{-1}$.

According to the second main embodiment of the invention, the glass sheet has a coefficient of absorption at the wavelengths of 1050, 950 and 850 nm which is significantly lower than that of a glass of the prior art having an equivalent colour and/or light transmission.

The glass sheet according to the invention can advantageously be chemically or thermally tempered. It may also be advantageously deformed (for example by thermoforming). A common example is bending, known for glass sheets intended for motor vehicle glazing, but any other deformation of the glass sheet may be envisaged, without departing from the scope of the invention.

The glass sheet according to the invention may advantageously be laminated with a polymeric interlayer film (generally of PVB or polyvinyl butyral) and optionally a second, identical or different, glass sheet in order to form a laminated structure.

The glass sheet according to the invention can also advantageously be coated with at least one transparent and electrically conducting thin layer. A transparent and conducting thin layer according to the invention can, for example, be a layer based on $SnO_2$:F, $SnO_2$:Sb or ITO (indium tin oxide), ZnO:Al or else ZnO:Ga.

The glass sheet can also be coated with at least one antireflection layer. This is advantageous in particular in the case of use of the glass sheet of the invention as front face of a screen. An antireflection layer according to the invention can, for example, be a layer based on porous silica having a low refractive index or it can be composed of several layers (stack), in particular a stack of layers of dielectric material alternating layers having low and high refractive indexes and terminating in a layer having a low refractive index.

The glass sheet according to the invention can also advantageously be coated with at least one anti-fingerprint layer. This is advantageous in the case of use of the glass sheet of the invention as touch surface. Such a layer can be combined with a transparent and electrically conducting thin layer deposited on the opposite face. Such a layer can be combined with an antireflection layer deposited on the same face, the anti-fingerprint layer being on the outside of the stack and thus covering the antireflection layer.

The glass sheet according to the invention can also be treated on at least one of its main faces, for example by frosting with acid or base, so as to generate anti-fingerprint properties or else antireflection or antiflicker properties, or else by a treatment that generates antibacterial properties (e.g. silver-based treatment). This is also advantageous in particular in the case of use of the glass sheet of the invention as front face of a touch or non-touch screen.

In addition, the invention also relates to a touch screen or a touch panel or a touchpad comprising at least one glass sheet according to the invention defining a touch surface. According to this embodiment, the touch screen or the touch panel or the touchpad advantageously uses the FTIR or PSD optical technology. In particular, for a screen, the glass sheet is advantageously fitted above a display surface.

According to the applications and/or properties desired, other layers/other treatments can be deposited/carried out on one and/or the other face of the glass sheet according to the invention.

Finally, the invention also relates to the use of a glass sheet according to the invention in a device using infrared radiation propagating essentially inside said sheet. The two main embodiments of the glass sheet according to the invention and also all their specific embodiments also apply to the use according to the invention as embodiments of the use.

The term "radiation propagating essentially inside the sheet" is understood to mean radiation which travels in the body of the glass sheet between the two main faces of the sheet.

Advantageously, according to a specific embodiment of the use according to the invention, the propagation of the infrared radiation takes place by total internal reflection. According to this embodiment, the infrared radiation can be injected inside the glass sheet starting from one or more edge(s) of said sheet. The term "edge of the sheet" is understood to mean each of the four surfaces defined by the thickness of the sheet and substantially perpendicular to the two main faces of the sheet. Still according to this embodiment, alternatively, the infrared radiation can be injected inside the glass sheet starting from one or both main face(s) with a certain angle.

Particularly advantageously according to the use of the invention, the composition is according to the first main embodiment of the glass sheet according to the invention.

The examples which follow illustrate the invention without the intention of limiting its coverage in any way.

EXAMPLES

Various glass sheets according to the invention were prepared or calculated/simulated, in the form of 5 sets, with variable amounts of total iron, chromium, cobalt and selenium and/or nickel.

For the preparation of the glass sheets according to the invention: the starting materials were mixed in the powder form and placed in a crucible for the melting, according to an identical base composition specified in the table below, and to which were added starting materials comprising iron, chromium, cobalt and selenium and/or nickel in variable amounts as a function of the contents targeted in the final composition (it should be noted that the iron is already, at least in part, present in the starting materials of the base composition as impurity).

| Base composition | Content [% by weight] |
| --- | --- |
| $SiO_2$ | 71.71 |
| CaO | 8.24 |
| $K_2O$ | 0.02 |
| $Na_2O$ | 14.20 |
| $SO_3$ | 0.33 |
| $Al_2O_3$ | 1.0 |
| MgO | 4.50 |

The optical properties of each composition prepared by melting, in sheet form, were determined on a Perkin Elmer Lambda 950 spectrophotometer equipped with an integrating sphere with a diameter of 150 mm, and in particular:

the transmission TIR4 was determined according to the ISO 9050 standard for a thickness of 4 mm and for a wavelength range between 780 and 2500 nm;

the light transmission TLD4 was also determined according to the ISO 9050 standard for a thickness of 4 mm at a solid observation angle of 2° (illuminant D65) and for a wavelength range between 380 and 780 nm;

the CIE L*a*b* parameters were determined in transmission with the following measurement parameters: illuminant D65, 10°, thickness 5 mm.

For the simulation of the glass compositions according to the invention: the optical properties of various glass sheets were calculated on the basis of the optical properties of the various colourants (coefficients of absorption given by Bamford's theory).

The glass sheets from Examples 12 and 13 were prepared by melting and their optical properties were measured. The same optical properties were also measured for commercial glass sheets, as comparative examples (Examples 3, 6, 9, 11 and 14).

The optical properties of Examples 1, 2, 4, 5, 7, 8 and 10 are derived from simulation/calculations.

Set 1

Examples 1 and 2 correspond to glass sheets according to the invention. Example 3 (comparative example) corresponds to a coloured glass from the prior art having a high iron content (grey glass sold under the name "Planibel Grey"). Each Example 1-2 of composition according to the invention was optimized so as to achieve values of the colorimetric parameters (a*b*) and of the light transmission (TLD4) that are similar to the grey glass of the comparative example (glass offered on the market), but while maximizing the transmission of infrared radiation (TIR4).

Table 1 presents the optical properties calculated for Examples 1 and 2 and measured for Comparative Example 3, and also their respective amounts of iron, chromium, cobalt, selenium and nickel.

FIG. 1(a) represents the curves in transmission for one and the same glass thickness between the wavelengths 290 and 2500 nm (thus including the visible and near infrared regions) of Examples 1 and 2 according to the invention and of Example 3 according to the prior art ("Planibel Grey" grey glass). FIG. 1(b) represents an enlargement of FIG. 1(a) between the wavelengths 400 and 1250 nm.

TABLE 1

| | $Fe_2O_3$ ppm | $Cr_2O_3$ ppm | Co ppm | Se ppm | Ni ppm | µ 850 nm (m⁻¹) | µ 950 nm (m⁻¹) | µ 1050 nm (m⁻¹) | TLD4 (%) | TIR4 (%) | Colorimetric parameters | | |
|---|---|---|---|---|---|---|---|---|---|---|---|---|---|
| | | | | | | | | | | | L* | a* | b* |
| 1 | 431 | 288 | 70 | 200 | 0 | 4.2 | 4.6 | 5.3 | 55.9 | 89.9 | 75.6 | −1.6 | −2.3 |
| 2 | 200 | 133 | 68 | 468 | 56 | 7.5 | 8.0 | 2.9 | 55.7 | 89.9 | 75.5 | 1 | −2.4 |
| 3 | 3710 | 17 | 62 | 19 | 0 | 130.6 | 153.1 | 163.3 | 54.5 | 54.4 | 74.7 | 0.6 | −1.9 |

Figure 1:
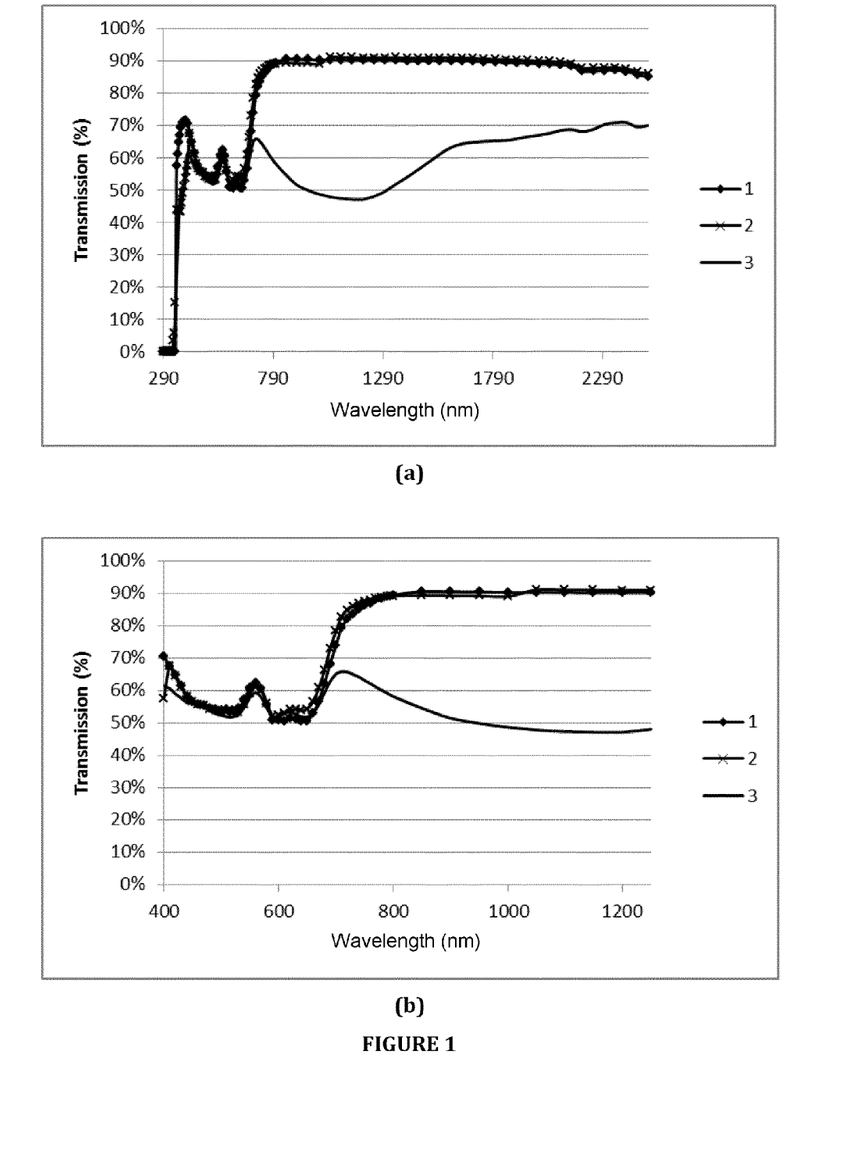

The results obtained (see FIG. 1 and Table 1) show that the addition of chromium, cobalt and selenium and/or nickel in a content range according to the invention (second main embodiment) in combination with a low iron content makes it possible to obtain a glass sheet with a $T_L$ and a colour that are highly comparable to a commercial grey glass, while very significantly increasing the transmission in the infrared region (highly increased TIR4 or very low µ).

Set 2

Examples 4 and 5 correspond to glass sheets according to the invention. Example 6 (comparative example) corresponds to a coloured glass from the prior art having a high iron content (dark grey glass sold under the name "Planibel Dark Grey"). Each Example 4-5 of composition according to the invention was optimized so as to achieve values of the colorimetric parameters (a*b*) and of the light transmission (TLD4) that are similar to the dark grey glass of Comparative Example 6 (glass offered on the market), but while maximizing the transmission of infrared radiation (TIR4).

Table 2 presents the optical properties calculated for Examples 4 and 5 and measured for Example 6, and also their respective amounts of iron, chromium, cobalt, selenium and nickel.

Figure 2:
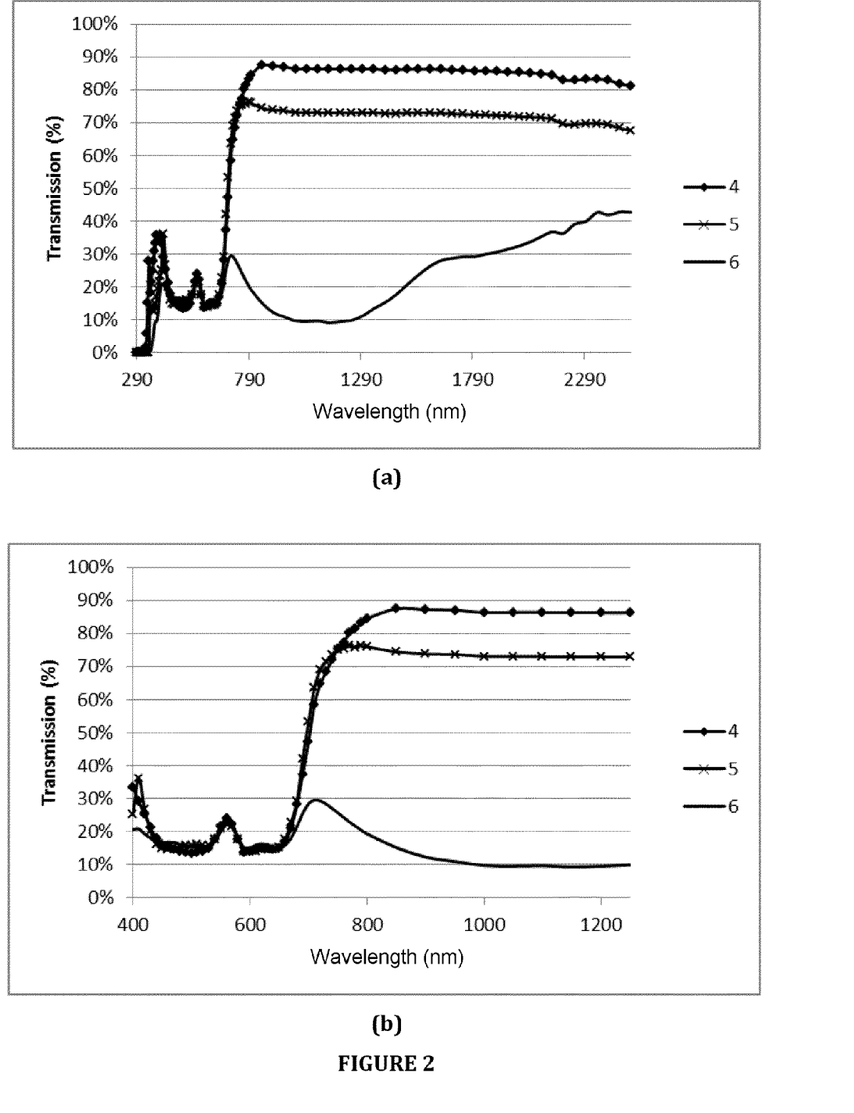

FIG. 2(a) represents the curves in transmission for one and the same glass thickness between the wavelengths 290 and 2500 nm (thus including the visible and near infrared regions) of Examples 4 and 5 according to the invention and of Example 6 according to the prior art ("Planibel Dark Grey" dark grey glass). FIG. 2(b) represents an enlargement of FIG. 2(a) between the wavelengths 400 and 1250 nm.

content makes it possible to obtain a dark grey glass sheet that is highly comparable in terms of colour and $T_L$ to a dark grey glass from the prior art, while very significantly increasing the transmission in the infrared region (highly increased TIR4 or very low µ).

Set 3

Examples 7 and 8 correspond to glass sheets according to the invention. Example 9 (comparative example) corresponds to a coloured glass from the prior art having a high iron content (bronze glass sold under the name "Planibel Bronze"). Each Example 7 and 8 of composition according to the invention was optimized so as to achieve values of the colorimetric parameters (a*b*) and of the light transmission (TLD4) that are similar to the bronze glass of Comparative Example 9 (glass offered on the market), but while maximizing the transmission of infrared radiation (TIR4).

Table 3 presents the optical properties calculated for Examples 7 and 8 and measured for Comparative Example 9, and also their respective amounts of iron, chromium, cobalt, selenium and nickel.

FIG. 3(a) represents the curves in transmission for one and the same glass thickness between the wavelengths 290 and 2500 nm (thus including the visible and near infrared

TABLE 2

| | $Fe_2O_3$ ppm | $Cr_2O_3$ ppm | Co ppm | Se ppm | Ni ppm | µ 850 nm (m⁻¹) | µ 950 nm (m⁻¹) | µ 1050 nm (m⁻¹) | TLD4 (%) | TIR4 (%) | Colorimetric parameters | | |
|---|---|---|---|---|---|---|---|---|---|---|---|---|---|
| | | | | | | | | | | | L* | a* | b* |
| 4 | 670 | 800 | 215 | 560 | 0 | 12.8 | 14.2 | 16.0 | 17.2 | 86 | 40 | 1.3 | −1 |
| 5 | 690 | 460 | 204 | 256 | 656 | 53.0 | 55.8 | 57.7 | 17.4 | 73.4 | 40.3 | −1.2 | −0.1 |
| 6 | 11460 | 68 | 177 | 37 | 0 | 451.5 | 533.1 | 568.1 | 17.3 | 16.5 | 40.2 | −0.1 | 0.5 |

The results obtained (see FIG. 2 and Table 2) show that the addition of chromium, cobalt and selenium and/or nickel in a content range according to the invention (second main embodiment) in combination with a relatively low iron regions) of Examples 7 and 8 according to the invention and of Example 9 according to the prior art ("Planibel Bronze" Bronze glass). FIG. 3(b) represents an enlargement of FIG. 3(a) between the wavelengths 400 and 1250 nm.

TABLE 3

| | $Fe_2O_3$ ppm | $Cr_2O_3$ ppm | Co ppm | Se ppm | Ni ppm | µ 850 nm (m⁻¹) | µ 950 nm (m⁻¹) | µ 1050 nm (m⁻¹) | TLD4 (%) | TIR4 (%) | Colorimetric parameters | | |
|---|---|---|---|---|---|---|---|---|---|---|---|---|---|
| | | | | | | | | | | | L* | a* | b* |
| 7 | 400 | 200 | 45 | 341 | 0 | 2.7 | 3.0 | 3.4 | 57.9 | 90.5 | 76.7 | 3.1 | 5.2 |
| 8 | 206 | 137 | 38 | 566 | 41 | 4.8 | 5.1 | 2.9 | 60.9 | 90.4 | 78.7 | 3.3 | 5.3 |
| 9 | 3130 | 33 | 30 | 27 | 0 | 104.5 | 119.8 | 126.0 | 60.9 | 61.2 | 78.7 | 3.3 | 5.3 |

Figure 3:
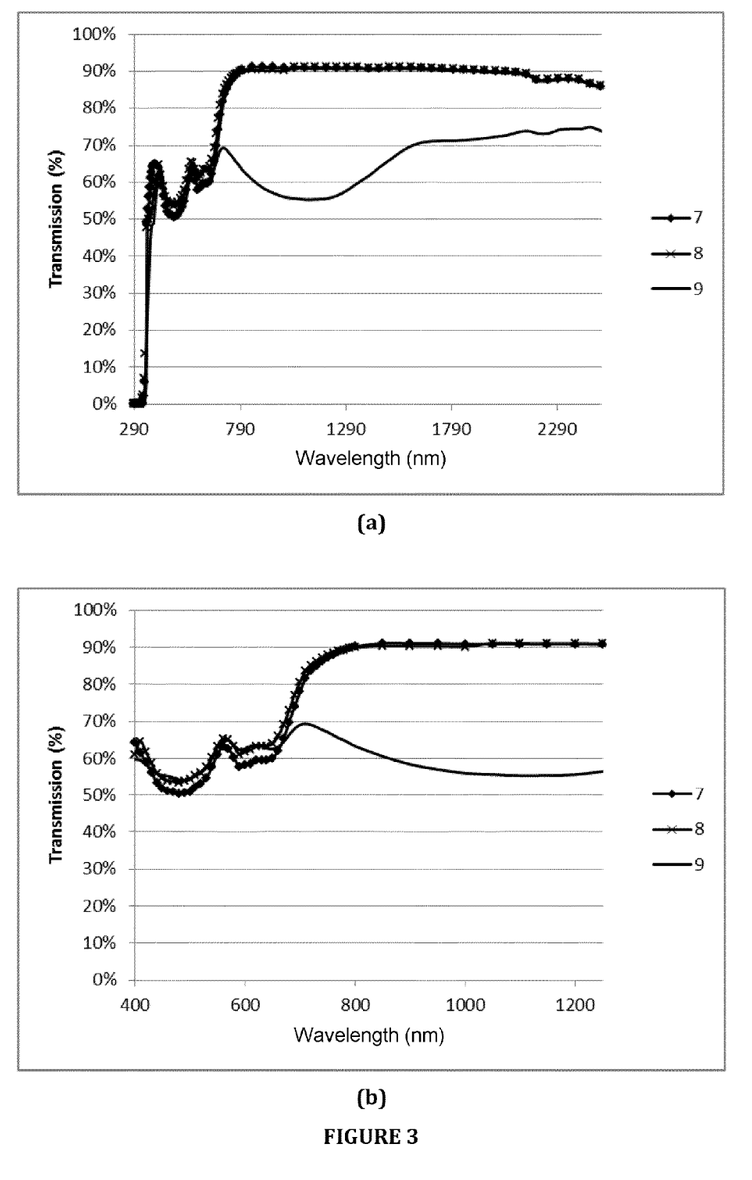

The results obtained (see FIG. 3 and Table 3) show that the addition of chromium, cobalt and selenium and/or nickel in a content range according to the invention (second main embodiment) in combination with a low iron content makes it possible to obtain a bronze glass sheet that is highly comparable in terms of colour and $T_L$ to a commercial bronze glass, while very significantly increasing the transmission in the infrared region (highly increased TIR4 or very low μ).

Set 4

Example 10 corresponds to a glass sheet according to the invention. Example 11 (comparative example) corresponds to a coloured glass from the prior art having a high iron content (light grey glass sold under the name "Optigrey"). Example 10 of composition according to the invention was optimized so as to achieve values of the colorimetric parameters (a*b*) and of the light transmission (TLD4) that are similar to the light grey glass of Comparative Example 10 (glass offered on the market), but while maximizing the transmission of infrared radiation (TIR4).

Table 4 presents the optical properties calculated for Example 10 and measured for Example 11, and also their respective amounts of iron, chromium, cobalt and selenium.

FIG. 4(a) represents the curves in transmission for one and the same glass thickness between the wavelengths 290 and 2500 nm (thus including the visible and near infrared regions) of Example 10 according to the invention and of Example 11 according to the prior art ("Optigrey" light grey glass). FIG. 4(b) represents an enlargement of FIG. 4(a) between the wavelengths 400 and 1250 nm.

TABLE 4

|  | $Fe_2O_3$ | $Cr_2O_3$ | Co | Se | μ 850 nm | μ 950 nm | μ 1050 nm | TLD4 | TIR4 | Colorimetric parameters | | |
|---|---|---|---|---|---|---|---|---|---|---|---|---|
|  | ppm | ppm | ppm | ppm | (m$^{-1}$) | (m$^{-1}$) | (m$^{-1}$) | (%) | (%) | L* | a* | b* |
| 10 | 750 | 111 | 36 | 74 | 2.1 | 2.4 | 2.9 | 70.1 | 90.8 | 84.7 | 0 | 0 |
| 11 | 3300 | 0 | 23 | 7 | 139.3 | 165.1 | 174.3 | 70.1 | 53 | 84.7 | −1.3 | −0.1 |

Figure 4:
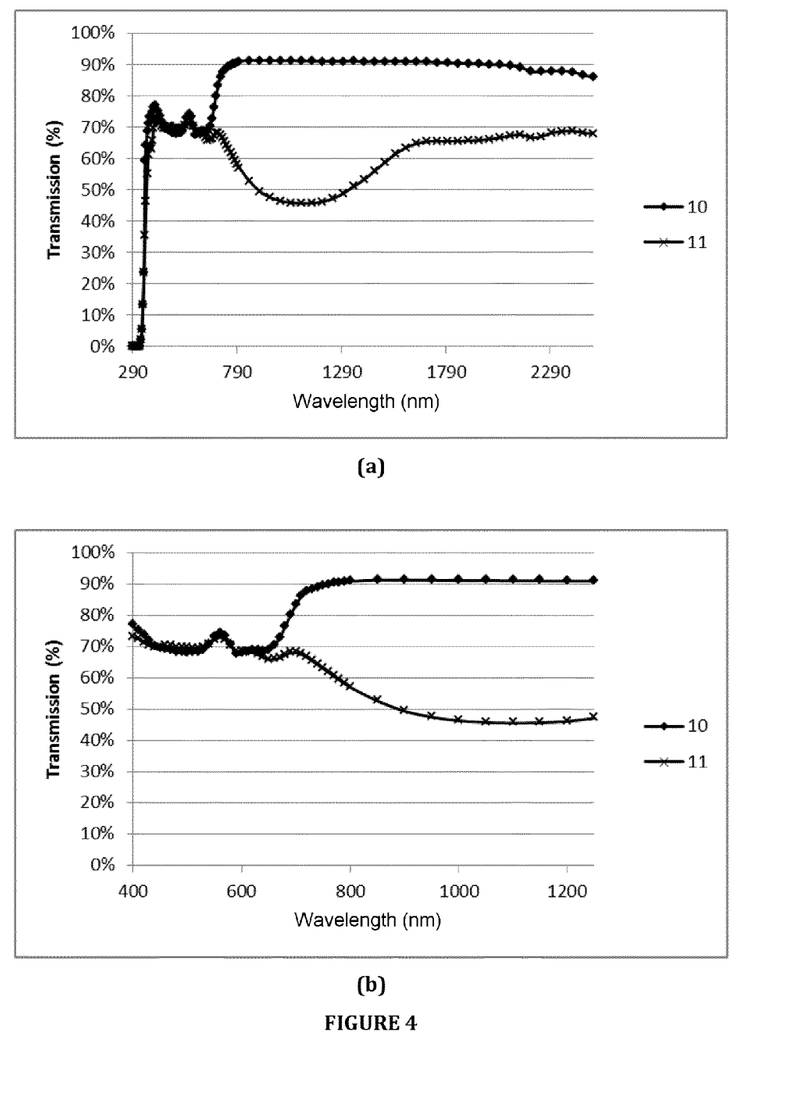

The results obtained (see FIG. 4 and Table 4) show that the addition of chromium, cobalt and selenium in a content range according to the invention (second main embodiment) in combination with a low iron content makes it possible to obtain a light grey glass sheet that is highly comparable in terms of $T_L$ to a commercial light grey glass but that is aesthetically more neutral, while very significantly increasing the transmission in the infrared region (highly increased TIR4 or very low μ).

Set 5

Examples 12 and 13 correspond to coloured glass sheets according to the invention. Example 14 (comparative example) corresponds to a conventional clear glass from the prior art (clear glass sold under the name "Planibel clear").

Table 5 presents the optical properties measured for Examples 12-14 and also their respective amounts of iron, chromium, cobalt and selenium.

FIG. 5(a) represents the curves in transmission for one and the same glass thickness between the wavelengths 290 and 2500 nm (thus including the visible and near infrared regions) of Examples 12-13 according to the invention and of Example 14 according to the prior art (clear glass). FIG. 5(b) represents an enlargement of FIG. 5(a) between the wavelengths 400 and 1250 nm.

TABLE 5

|  | $Fe_2O_3$ | $Cr_2O_3$ | Co | Se | μ 850 nm | μ 950 nm | μ 1050 nm | TLD4 | TIR4 | Colorimetric parameters | | |
|---|---|---|---|---|---|---|---|---|---|---|---|---|
|  | ppm | ppm | ppm | ppm | (m$^{-1}$) | (m$^{-1}$) | (m$^{-1}$) | (%) | (%) | L* | a* | b* |
| 12 | 480 | 168 | 45 | 48 | 5.5 | 3.5 | 4.4 | 65.8 | 89.3 | 82.2 | −1.8 | −2.4 |
| 13 | 480 | 167 | 44 | 53 | 5.0 | 3.3 | 4.3 | 66.9 | 89.4 | 82.8 | −2.3 | −2.3 |
| 14 | 850 | 0 | 0 | 0 | 33.9 | 39.5 | 41.5 | 89.7 | 80.6 | 95.7 | −1.1 | 0.2 |

Figure 5:
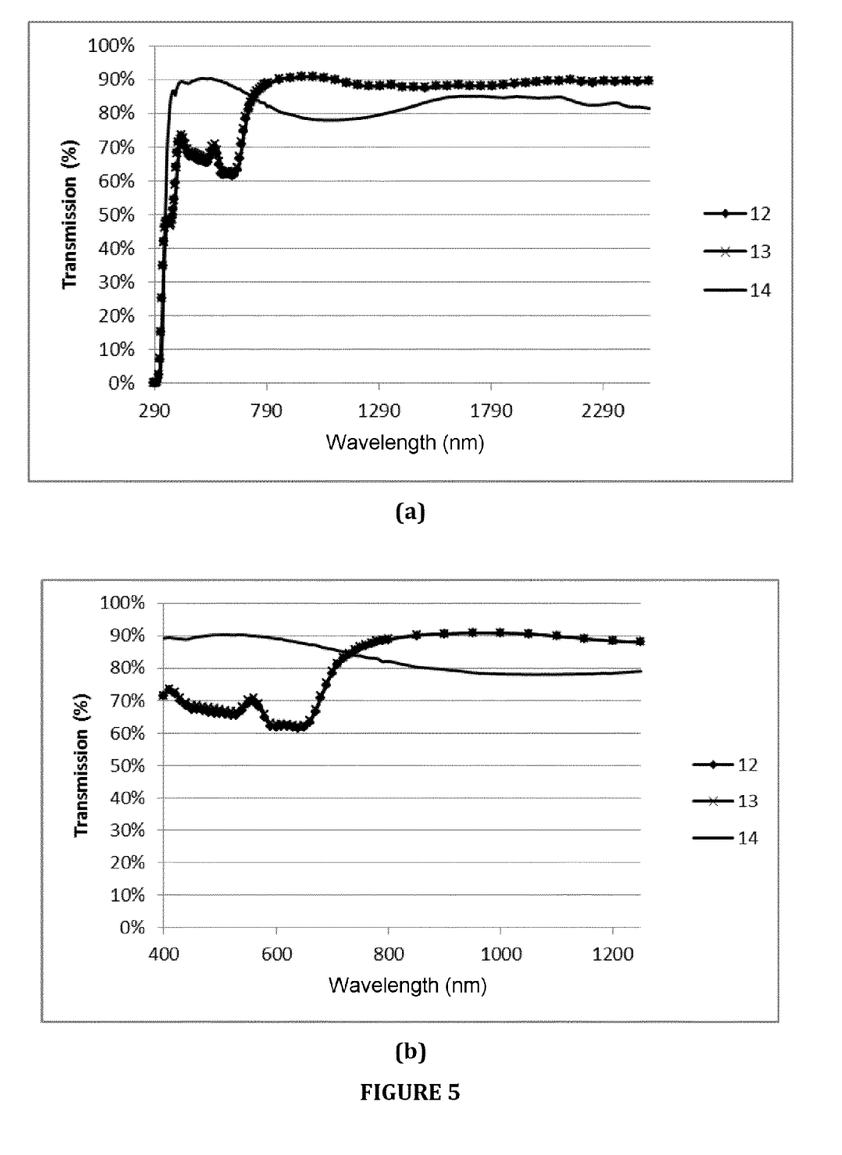

The results obtained (see FIG. 5 and Table 5) show that the addition of chromium, cobalt and selenium in a content range according to the invention in combination with a low iron content makes it possible to obtain a coloured glass sheet (with a lower $T_L$), while more than significantly increasing its transmission in the infrared region (with respect to the coloured glasses from the corresponding prior art, but also in comparison with a clear glass from the prior art—Ex. 14).

Furthermore, Examples 12 and 13 according to the invention, coloured glass sheets, exhibit coefficients of absorption in the IR region which are lower than those of a clear glass from the prior art (Example 14).

The invention claimed is:

1. A glass sheet having a composition which comprises, in a content expressed as percentages by total weight of glass:
    $SiO_2$: 55-85%,
    $Al_2O_3$: 0-30%,
    $B_7O_3$: 0-20%,
    $Na_2O$: 0-25%,
    CaO: 0-20%,
    MgO: 0-15%,
    $K_2O$: 0-20%,
    BaO: 0-20%,
    total iron, expressed in the form of $Fe_2O_3$: 0.002-1%,
    chromium, expressed in the form of $Cr_2O_3$: 0.001% to 0.5%,
    cobalt, expressed in the form of Co: 0.0001% to 0.5%, and
    selenium, expressed in the form of Se: 0.0003% to 0.5%,
    wherein the sheet has: TIR4>TLD4;
    TIR4 being an IR transmission for a wavelength range between 780 and 2500 nm and TLD4 being a light transmission with illuminant D65 at a solid observation angle of 2° for a wavelength range between 380 and 780 nm; each being in % and according to the ISO 9050 standard for a sheet thickness of 4 mm, and
wherein the composition comprises an $Fe^{2+}$ content (expressed in the form of FeO) of less than 20 ppm.

2. The glass sheet according to claim 1, wherein the composition comprises a total iron content such that: $0.002 \leq Fe_2O_3 \leq 0.3\%$.

3. The glass sheet according to claim 1, wherein the composition comprises a total iron content such that: $0.002 \leq Fe_2O_3 \leq 0.06\%$.

4. The glass sheet according to claim 1, wherein the composition comprises a total iron content such that: $0.002 \leq Fe_2O_3 \leq 0.04\%$.

5. The glass sheet according to claim 1, wherein $Fe_2O_3 \leq 7*Cr_2O_3$.

6. The glass sheet according to claim 1, wherein the composition comprises:
a total iron content, expressed in the form of $Fe_2O_3$, $\leq 0.7\%$;
a chromium content, expressed in the form of $Cr_2O_3$, $\leq 0.0465\%$;
a cobalt content, expressed in the form of Co, $\leq 0.004\%$; wherein:

$(Se*Fe_2O_3) \leq 0.0012\%$; and $(3000*Co)+(260*Cr_2O_3)+(10000*Se*Fe_2O_3)+(16.2*Fe_2O_3)<12$.

7. The glass sheet according to claim 1, wherein the composition comprises:
a total iron content, expressed in the form of $Fe_2O_3$, $\leq 0.4\%$;
a chromium content, expressed in the form of $Cr_2O_3$, $\leq 0.027\%$;
a cobalt content, expressed in the form of Co, $\leq 0.0023\%$; wherein:

$(Se*Fe_2O_3) \leq 0.0007\%$; and $(3000*Co)+(260*Cr_2O_3)+(10000*Se*Fe_2O_3)+(16.2*Fe_2O_3)<7$.

8. The glass sheet according to claim 1, wherein the composition comprises:
a total iron content, expressed in the form of $Fe_2O_3$, $\leq 0.2\%$;
a chromium content, expressed in the form of $Cr_2O_3$, $\leq 0.011\%$;
a cobalt content, expressed in the form of Co, $\leq 0.001\%$; wherein:

$(Se*Fe_2O_3) \leq 0.0003\%$; and $(3000*Co)+(260*Cr_2O_3)+(10000*Se*Fe_2O_3)+(16.2*Fe_2O_3)<3$.

9. The glass sheet according to claim 1, wherein: $(3000*C)+(260*Cr_2O_3)+(10000*Se*Fe_2O_3)+(16.2*Fe_2O_3) \leq 12$.

10. The glass sheet according to claim 9, wherein: $1*Co<Se<10*Co$.

11. The glass sheet according to claim 9, wherein: $2*Co<Se<17*Co$.

12. The glass sheet according to claim 9, wherein: $1*Co<Cr_2O_3<10*Co$.

13. The glass sheet according to claim 9, wherein: $2*Co<Cr_2O_3<10*Co$.

14. The glass sheet according to claim 1, wherein the composition comprises a TLD4>80%.

15. A touch screen or touch panel or touchpad, comprising at least one glass sheet according to claim 1 as a touch surface.

16. A glass sheet having a composition which comprises, in a content expressed as percentages by total weight of glass:
$SiO_2$: 60-75%,
$Al_2O_3$: 0-6%,
$B_2O_3$: 0-4%,
$Na_2O$: 5-20%,
CaO: 0-15%,
MgO: 0-10%,
$K_2O$: 0-10%,
BaO: 0-5%,
total iron, expressed in the form of $Fe_2O_3$: 0.002-1%,
chromium, expressed in the form of $Cr_2O_3$: 0.001% to 0.5%,
cobalt, expressed in the form of Co: 0.0001% to 0.5%, and
selenium, expressed in the form of Se: 0.0003% to 0.5%,
wherein the sheet has: TIR4>TLD4;
TIR4 being an IR transmission for a wavelength range between 780 and 2500 nm and TLD4 being a light transmission with illuminant D65 at a solid observation angle of 2° for a wavelength range between 380 and 780 nm; each being in % and according to the ISO 9050 standard for a sheet thickness of 4 mm,
wherein the composition comprises an $Fe^{2+}$ content (expressed in the form of FeO) of less than 20 ppm.

17. The glass sheet according to claim 6, wherein $Fe_2O_3 \leq 7*Cr_2O_3$.

18. The glass sheet according to claim 16, wherein hre composition comprises:
a total iron content, expressed in the form of $Fe_2O_3$, $\leq 0.7\%$;
a chromium content, expressed in the form of $Cr_2O_3$, $\leq 0.0465\%$;
a cobalt content, expressed in the form of Co, $\leq 0.004\%$; wherein:

$(Se*Fe_2O_3) \leq 0.0012\%$; and $(3000*Co)+(260*Cr_2O_3)+(10000*Se*Fe_2O_3)+(16.2*Fe_2O_3)<12$.

19. The glass sheet according to claim 16, wherein the composition comprises a TLD4>80%.

20. A touch screen or touch panel or touchpad, comprising at least one glass sheet according to claim 16 as a touch surface.

* * * * *